United States Patent [19]

Boni

[11] Patent Number: 4,630,720
[45] Date of Patent: Dec. 23, 1986

[54] VEHICLE DRIVE ARRANGEMENT

[75] Inventor: Renato Boni, Carpi, Italy

[73] Assignee: Massey-Ferguson Services N.V., Curacao, Netherlands Antilles

[21] Appl. No.: 700,580

[22] PCT Filed: Jun. 25, 1984

[86] PCT No.: PCT/EP84/00191
§ 371 Date: Feb. 11, 1985
§ 102(e) Date: Feb. 11, 1985

[87] PCT Pub. No.: WO85/00205
PCT Pub. Date: Jan. 17, 1985

[30] Foreign Application Priority Data

Jun. 28, 1983 [GB] United Kingdom ................. 8317452

[51] Int. Cl.⁴ ............................................. F16D 21/02
[52] U.S. Cl. .................................. 192/48.8; 192/70.3; 192/89 A; 192/96; 192/98
[58] Field of Search ..................... 192/48.1, 48.3, 48.7, 192/48.8, 48.9, 70.21, 70.3, 98, 96, 101, 89 A; 74/15.6, 15.63, 15.66, 15.69

[56] References Cited

U.S. PATENT DOCUMENTS

| 1,993,405 | 2/1933 | Heitshu. | |
|---|---|---|---|
| 2,137,977 | 11/1938 | Kattwinkel | 192/48.7 |
| 2,237,322 | 4/1941 | West | 192/48.8 |
| 3,181,668 | 5/1965 | Sink | 192/48.9 |
| 4,445,601 | 5/1984 | Hofbauer et al. | 192/48.8 |

FOREIGN PATENT DOCUMENTS

| 903175 | 12/1953 | Fed. Rep. of Germany. |
| 491675 | 5/1937 | United Kingdom. |
| 881724 | 5/1958 | United Kingdom. |
| 2041113 | 12/1980 | United Kingdom. |

Primary Examiner—George H. Krizmanich
Attorney, Agent, or Firm—Robert L. Farris

[57] ABSTRACT

A vehicle drive arrangement in which a drive shaft (10a) is coupled with a first hollow driven shaft (12) and a second driven shaft (11) within hollow driven shaft (12) by first (14) and second (13) coaxial clutches respectively clutch (13) which is adjacent flywheel (10) is operated by a force transmitting path in the form of pins (17) located outside both driven shafts and passing axially through the central portion (24) of clutch (14). This produces a more compact arrangement since the force transmitting path for the operation of clutch (13) does not pass around the outer periphery of clutch (14).

7 Claims, 1 Drawing Figure

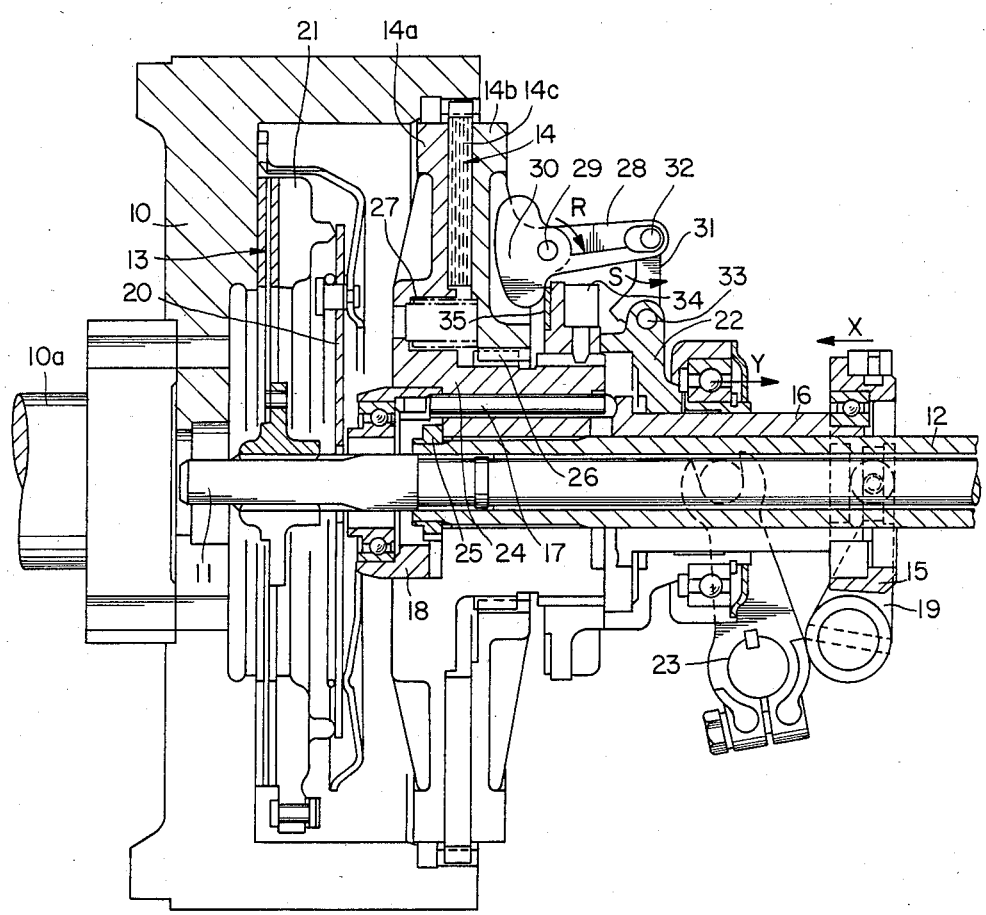

VEHICLE DRIVE ARRANGEMENT

TECHNICAL FIELD

This invention relates to vehicle drive arrangements, hereinafter referred to as being of the type described, in which a drive shaft is connected with a first hollow driven shaft via a co-axial first clutch and with second driven shaft (which is rotatable within the first driven shaft) via a co-axial second clutch.

Drive arrangements of the type described are used in, for example, agricultural or industrial tractors of the wheeled or crawler type in which, for example, one of the driven shaft is a gearbox input shaft and the other driven shaft is a PTO (power take-off) shaft.

There is a requirement in such drive arrangements to operate each clutch independently for maximum vehicle operational flexibility. Since the clutches are co-axial and normally axially adjacent each other within a housing, access to operate one clutch is normally straightforward but the operation of the other clutch has hitherto proved more difficult and relatively complex and bulky arrangements have been previously proposed which have involved passing round the outer periphery of the one clutch to operate the other clutch.

DISCLOSURE OF THE INVENTION

It is an object of the present invention to provide an improved form of vehicle drive arrangement of the type described.

According to the present invention there is provided a vehicle drive arrangement having a drive shaft, a first hollow driven shaft, a second driven shaft rotatable within the first hollow driven shaft, and first and second clutches co-axial with the driven shafts for coupling the drive shaft with the first and second driven shafts respectively, the arrangement being characterised in that one of the clutches is operated by a force transmitting path which is located outside both driven shafts and which passes axially through the central portion of the other clutch.

It will be appreciated that such an arrangement is more compact since the force transmitting path no longer passes around the other periphery of the one clutch. Also, since the force transmitting path is located outside both driven shafts there is no limit on the distance the two driven shafts can be located one within the other.

In a preferred construction the first clutch is operatively connected with the hollow driven shaft via a central hub portion and the force transmitting path for the second clutch comprises operating members which extend axially through the central hub portion.

The operating members may be axially displaced by an actuating component which encircles the hollow driven shaft.

The actuating component may act on one end of each operating member, the other end of each operating member being operatively connected with a thrust bearing for operation of the second clutch.

Each operating member may comprise a pin which is axially slidable in a bore in the central hub portion.

The first clutch may be operated via a collar which encircles and slides on the actuating component.

DESCRIPTION OF THE DRAWINGS

One embodiment of the invention will now be described, by way of example only, with reference to the accompanying drawing which shows a vertical section through a dual clutch arrangement embodying the present invention for use in a crawler tractor.

BEST MOST OF CARRYING OUT INVENTION

Referring to the drawing a flywheel 10 is driven from an engine via a drive shaft 10a. A PTO shaft 11 passes down the centre of a hollow driven shaft 12 which functions as a gearbox input shaft. Power is transmitted from the flywheel 10 to the PTO shaft 11, via a single plate PTO friction clutch 13. The gearbox input shaft 12 is driven from the flywheel 10 via an over-centre clutch 14.

The PTO clutch 13 is disengaged by a thrust collar 15 which acts on an actuating component in the form of a sleeve 16 surrounding shaft 12. The sleeve 16 in turn acts on a number of operating members in the form of pins 17 which in turn are connected with a clutch release bearing 18. To release the PTO clutch 13, collar 15 is displaced in direction "X" using an operating fork 19. This causes a corresponding axial displacement of thrust bearing 18 which in turn contacts and displaces a diaphragm-spring 20 to release the pressure on clutch pressure plate 21 and thus disengage the clutch 13. On return of collar 15 to the position shown in the drawing the clutch 13 is automatically engaged by diaphragm-spring 20.

The over-centre clutch 14 is operated by a collar 22 and an associated fork 23. The Collar 22 surrounds sleeve 16 and is axially slidable thereon. Pressure plate 14a is integral with the central hub portion 24 of clutch 14 through which pins 17 extend. The Hub portion 24 is held axially fixed on shaft 12 by a ring 25. Pressure plate 14b is axially slidable relative to hub 24 on splines 26 and is biased away by springs 27 from central friction member 14c which is splined onto flywheel 10. Pressure plate 14b carries a series of circumferentially spaced arms 28 which are pivotally mounted on the pressure plate 29 and are provided with cam formations 30. Each arm 28 is connected with the collar 22 via a tie 31 which is pivoted on the arm at 32 and on the collar at 33.

The hub 24 carries an annular abutment 34 provided with a bearing surface 35 which is contacted by cam formations 30. When clutch 14 is in the engaged position shown in the drawing cam formations 30 contact the bearing surface 35 and the centre of the pivot 33 is to the left of the centre of pivot 32 as shown in the drawing.

To disengage the clutch 14 the collar 22 is moved axially in direction "Y" using the fork 23. This causes ties 31 to pivot in an anti-clockwise sense about pivot 32 as shown by arrow "S" and arms 28 to pivot clockwise about pivots 29 as shown by arrow "R". This causes the cam formations 30 to disengage the bearing surface 35 thus allowing the springs 27 to displace pressure plate 14b to the right as viewed in the drawing thus disengaging the clutch 14.

As will be understood, when collar 22 is moved to the clutch disengaged position pivot 33 moves over-centre to the right of pivot 32.

The present invention thus provides an improved form of vehicle drive arrangement of the type described in which the PTO clutch 13 is operated by a force transmitting path (provided by pins 17) which passes axially through the central portion of the over-centre gearbox clutch 14 thus simplifying and reducing the overall diameter of the clutch installation compared to an arrangement in which the PTO clutch 13 is operated by a linkage which passes around the outer periphery of the clutch 14. Also it will be appreciated that there is no limit on the distance for which the driven shafts 11 and 12 can be located one within the other.

It will be understood that the roles of shafts 11 and 12 could be reversed, that is shaft 11 could be used as the gearbox input shaft and shaft 12 could be the PTO shaft. Also, the roles of clutches 13 and 14 could be reversed.

What is claimed is:

1. A vehicle drive arrangement having a drive shaft (10a), a first hollow driven shaft (12), a second driven shaft (11) rotatable within the first hollow driven shaft, first and second clutches (13, 14) co-axial with the driven shafts for coupling the drive shaft with the first and second driven shafts respectively, one (14) of said clutches being connected with its associated driven shaft via a central hub portion (24), and the other clutch (13) being operated by a plurality of operating members (17) which passes through corresponding apertures in the central hub portion and which are located outside both driven shafts.

2. An arrangement according to claim 10 characterised in that the operating members (17) are axially displaced to operate said other clutch (13) by an actuating component (16) which encircles the hollow driven shaft (12).

3. An arrangement according to claim 2 characterized in that the actuating component (16) acts on one end of each operating member (17) and the other end of each operating member is operatively connected with a thrust bearing (18) for operation of said other clutch (13).

4. An arrangement according to claim 2 characterized in that each operating member comprises a pin (17) which is axially slidable in a bore in the central hub portion (24).

5. An arrangement according to claim 2 characterized in that said one (14) of the clutches is operated via a collar (22) which encircles and slides on the actuating component (16).

6. An arrangement according to claim 1 characterized in that said one (14) of the clutches is operated by an over-centre linkage (28, 29, 30, 31, 32).

7. An arrangement according to claim 1 characterized in that the first driven shaft (12) is a vehicle drive shaft and the second driven shaft (11) is a power take-off shaft.

* * * * *